United States Patent [19]

Maichle

[11] Patent Number: 4,924,943
[45] Date of Patent: May 15, 1990

[54] AGRICULTURAL PULLING MACHINE WITH AUTOMATIC PITCH VIBRATION DAMPING MECHANISM

[75] Inventor: Josef Maichle, Kornwestheim, Fed. Rep. of Germany

[73] Assignee: Robert Bosch GmbH, Stuttgart, Fed. Rep. of Germany

[21] Appl. No.: 329,015

[22] Filed: Mar. 24, 1989

[30] Foreign Application Priority Data

May 11, 1988 [DE] Fed. Rep. of Germany ....... 3816166

[51] Int. Cl.⁵ .............................................. A01B 63/11
[52] U.S. Cl. ........................................ 172/1; 172/450; 172/2; 280/407
[58] Field of Search ......................... 172/2, 7, 8, 9, 10, 172/450, 1; 280/407, 772, DIG. 1; 56/10.2; 318/587; 364/463

[56] References Cited

U.S. PATENT DOCUMENTS

| | | | |
|---|---|---|---|
| 4,108,463 | 8/1978 | Old | 172/450 |
| 4,132,273 | 1/1979 | Mortonson et al. | 172/7 X |
| 4,236,724 | 12/1980 | Schillings | 172/450 |
| 4,271,910 | 6/1981 | Schafer | 172/7 |
| 4,385,353 | 5/1983 | Schneider | 172/2 X |
| 4,470,121 | 9/1984 | Ebert | 364/463 X |
| 4,667,744 | 5/1987 | Kauss et al. | 172/2 |
| 4,679,633 | 7/1987 | Kauss | 172/7 X |
| 4,796,712 | 1/1989 | Rutkowski et al. | 172/7 |
| 4,809,179 | 2/1989 | Klinger et al. | 280/707 X |

Primary Examiner—Randolph A. Reese
Assistant Examiner—Jeffrey L. Thompson
Attorney, Agent, or Firm—Michael J. Striker

[57] ABSTRACT

An agricultural pulling machine such as a tractor or construction machine vehicle with an attachment comprises a mounting device for coupling the attachment to the agricultural machine and a device for active damping of pitch vibrations of the vehicle. The device for active damping including a power lift for moving the mounting device and a regulating device which controls movement of the mounting device in the region of its lifting position in dependence upon the vibrations of the vehicle during travel, and a force sensor producing signals to which the regulating device responds. The mounting device includes a lever, a housing of the vehicle and a side guiding member connecting the lever with the housing of the vehicle. The force sensor is arranged in a force flux of the lever between its connecting point to the housing and a supporting point of the side guiding member, wherein the regulating device is provided with a means for reducing disturbing influences on an operation of the vibration damping device during travel over a curve by the vehicle.

13 Claims, 4 Drawing Sheets

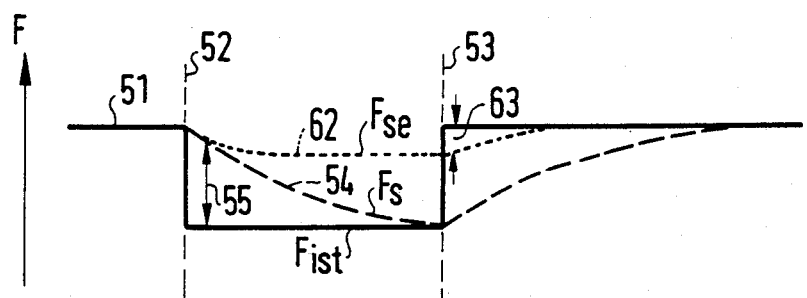
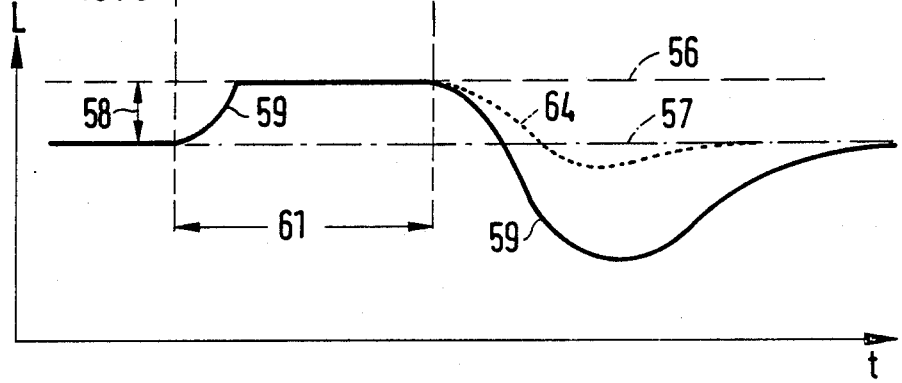
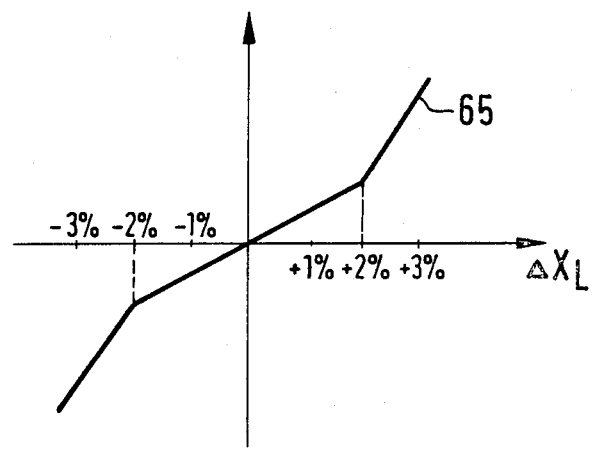

4,924,943

AGRICULTURAL PULLING MACHINE WITH AUTOMATIC PITCH VIBRATION DAMPING MECHANISM

BACKGROUND OF THE INVENTION

The present invention relates to an agricultural pulling machine, especially a tractor for a construction machine vehicle with a working attachment coupled through a mounting device and with a device for active damping of pitch vibrations of the vehicle.

Pulling machines of the above mentioned general type are known in the art. The German reference DE-OS 3,446,811 discloses a vehicle in which a plow is articulatedly connected with a tractor through a three-point linkage, and an active vibration damping of the attachment in its lifted position is performed through the electrohydraulic regulating device for plow adjustment. With such a system for dynamic stabilization of the movements of the vehicle, the pitch vibrations can be reduced so that with the attachment lifted, high transporting speeds and a high tearing safety are possible. For such a vibration damping, preferably the force regulating circuit and its associated force sensor are used. In this construction unfavorable operational conditions can occur, so that due to inaccurate signal detection, influences are produced which affect the quality of the vibration damping and can lead to increased movement amplitude of the attachment. The horizontal forces determined in levers by a force sensor can change during travel on curves, and/or during lateral swinging of the attachment when a part of the side guiding linkage connected with the lever transmits the horizontal forces to the housing of the tractor and thereby the accuracy of the results of the measurement is affected. The same is true also for tractor types in which the side guiding linkage includes not rigid rods, but instead pulling chains. Also in many types of tractors it is conventional to provide for this side guidance with additional supporting surfaces or cams attached to the housing, which limit lateral breakage of the levers.

The German reference DE-OS No. 3,346,892 discloses a vehicle with an articulately connected attachment. Here, the pitch vibrations of the tractor must be damped with the electrohydraulic lifting mechanism regulating device. A damping must here be achieved because the attachment in the vertical position is held spatially in an approximately immovable manner. For influencing and controlling transverse vibrations of the plow attached to the tractor, in this vehicle no measures are provided.

The patent document EP-No. A1-0 033,923 discloses a tractor with an electrohydraulic regulating device for plow adjustment. Here the lower lever is supported through force measuring pins on the housing of the tractor. The regulating device is operated with the sum of both signals of force measuring pins. An active vibration damping is here not provided. Unfavorable conditions for the force detection can take place especially when the connecting point of both levers on the housing of the tractor lie near one another and the lower lever which curves downwardly in a V-shaped manner, is supported through inclined side guiding linkage on the tractor frame, so that for example during travel on curves a part of the horizontal forces is transmitted to the housing of the tractor.

SUMMARY OF THE INVENTION

Accordingly, it is an object of the present invention to provide an agricultural pulling machine which avoids the disadvantages of the prior art.

In keeping with these objects and with others which will become apparent hereinafter, one feature of the present invention resides, briefly stated, in that the lever is supported on the housing of the vehicle through a side guiding member, the force sensor is arranged in a force flux of the lever between its connecting point with the housing and the supporting point of the side guiding member, and the device for active damping of stabilizing vibrations has means with which during travel of the vehicle over a curve the influences which act on the drive of the active vibration damping device are reduced.

When the agricultural machine is designed in accordance with the present invention, the operation of the active swinging damping during transportation travel of the vehicle with the attachment lifted and also during travel on curves and/or lateral swinging of the attachment is functionally reliable and safe. This is achieved in a simple and advantageous manner in that the signal which is used for active damping in the force regulating circuit which during travel on curve has a break is bridged in its influence over a short time. In the interest of an optimal utilization of the lifting height, further the adjusting movements on the lifting mechanism can be maintained as small as possible, which also leads to low loading of the structural parts. Further, the device can be made with relatively low expenses only in the electronic implementation. This breakin the summing signal of the force sensors, which occurs independently of type of the side guiding means such as rigid rods, pulling chains or supporting surfaces fixedly mounted on the housing, no longer has a disturbing influence on the swinging vibration damping. This operation is important since the break of the summing signal increases with the increase of an average lifting height.

In accordance with another feature of the present invention, when the pulling machine is provided with the regulating device which has a position regulating circuit and a force regulating circuit associated with the active vibration damping, the above mentioned means is provided with a low pass filter with a time constant which is changeable in dependence upon the actual value signals of a position sensor. The low pass filter in a position which corresponds to the average lifting position has a nominal value as a time constant T, whose value during deviation of the lifting mechanism in direction of the end position is increased, and during deviation below the average lifting position remains unchanged. When the vehicle is provided with these features, the low pass filter which is used in the dynamic force part is formed so that its time constant changes in dependence upon the position of the lifting mechanism. Thereby the adjusting movement of the lifting mechanism can be maintained as small as possible, which leads to an optimal utilization of the lifting height.

Still another feature of the present invention is that with a regulator arranged in the lower position regulating circuit, the regulator has a higher verification factor outside a predetermined inner working region. The regulator can be formed as a proportional regulator with a bent characteristic line. Thereby the influence of the position regulating circuit during feeding a predetermined limited value is considerably amplified by the regulator deviation, which is implemented in an especially advantageous manner with a regulator having a bent characteristic line. Also, disturbing influences on the active vibration damping during travel on curves is considerably reduced.

The force sensor can be formed as a force measuring pin arranged on the lever. The vehicle can be a tractor with a working attachment, especially a plow, coupled with the tractor through a three-point linkage. The mounting device can include two lower levers which are supported on the housing each through a force measuring pin and a side guiding member. The electronic control unit of the regulating device can be formed in a digital technique and can have a microprocessor which is especially advantageous.

Another feature of the present invention is a method of dynamic stabilization of the movements of a vehicle, in accordance with which during the signal break of the force sensor which occurs during travels on curves or transverse swinging of the attachment, by a change in a time constant T of a low pass filter function dependent on the position actual value, the occurring regulation difference on the curve end is maintained relatively small.

In the underlying position regulating circuit, during exceeding of a predetermined limiting value of the regulating deviation, the position of the amplifying factor of the regulator is increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 4 and 5 are views showing signal course during travel on curves in the vibration damping region;

FIG. 6 is a characteristic line of a regulator in a position regulating circuit.

DESCRIPTION OF THE PREFERRED EMBODIMENTS

Figure 1:
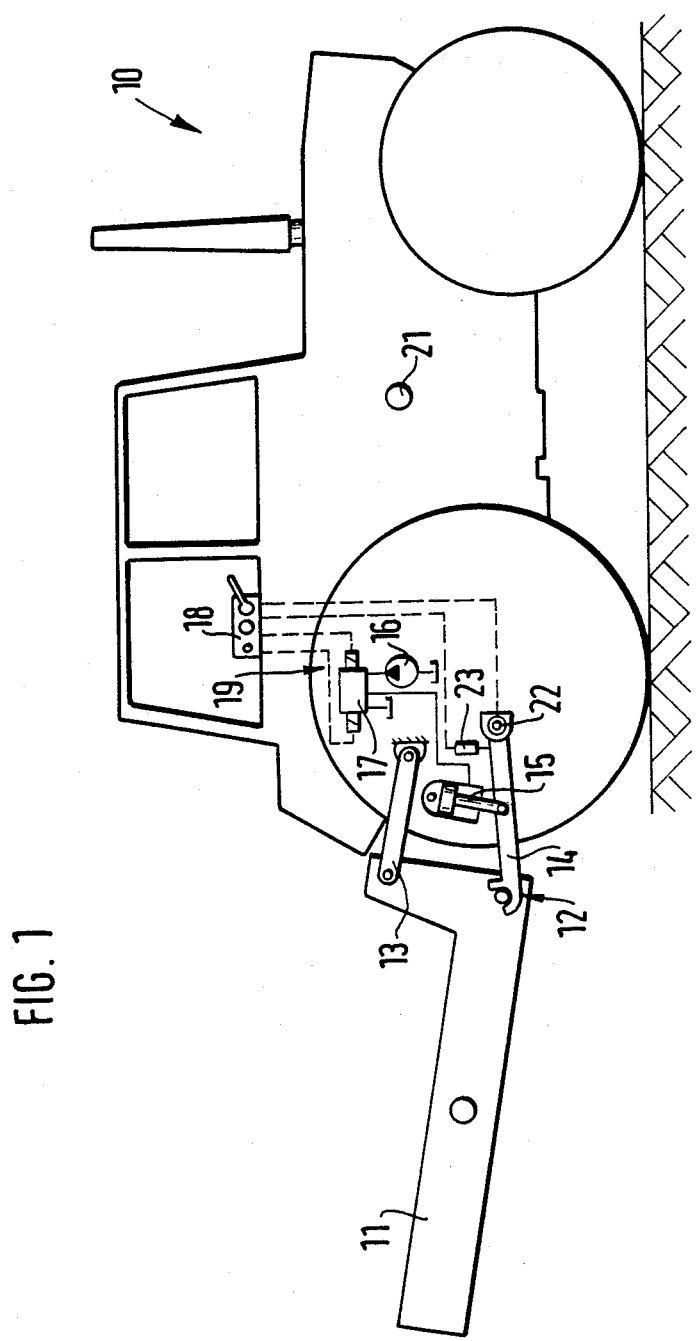
FIG. 1 shows a tractor with coupled attachment in a lifted position and with a device for active vibration damping during travel on curves.

FIG. 1 shows an agricultural pulling machine formed as a tractor 10 with attachment 11 mounted on its rear end and formed for example as a plow. The attachment 11 can be coupled in a height adjustable manner with an upper lever 13 and a lower lever 14 of the tractor 10 through a mounting device formed for example as a three-point linkage 12.

For adjusting the attachment 11 a hydraulic force lift 15 engages with the lower lever 14 and is connected in a hydraulic circuit with a pump 16 and an electrohydraulic regulating valve 17. The regulating valve 17 is controlled through an electronic control device 18. The control device 18, similarly to the control valve 17 and the three-point linkage 12 with the force lift 15, is a part of an electrohydraulic lifting mechanism regulating device 19. By this regulating device 19, the attachment 11 formed for example as a plow cannot also be operated only in the operation positions in different types of regulations, but also the attachment 11 can be transferred from the operating position to the shown lifted position in which it can move with limited amplitude about an average lifting position.

The regulating device 19 controls the movement of the attachment used as a suppression mass, so that the vibrations of the tractor 10, especially its stabilizing vibrations about its horizontal vibration axis 21, are actively damped. For this purpose the regulating device 19 processes the actual values from several sensors, wherein the lower lever 14 is articulately connected with the tractor 14 through a known force measuring pin 22. The force measuring pin 22 detects the horizontal force transmitted from the lower lever 14 and transmits the proportional electric signal to the electronic control device 18. Further, a position sensor 23 is provided, which supplies to the control device 18 the signals dependent upon the position of the attachment 11 relative to the tractor 10.

Figure 2:
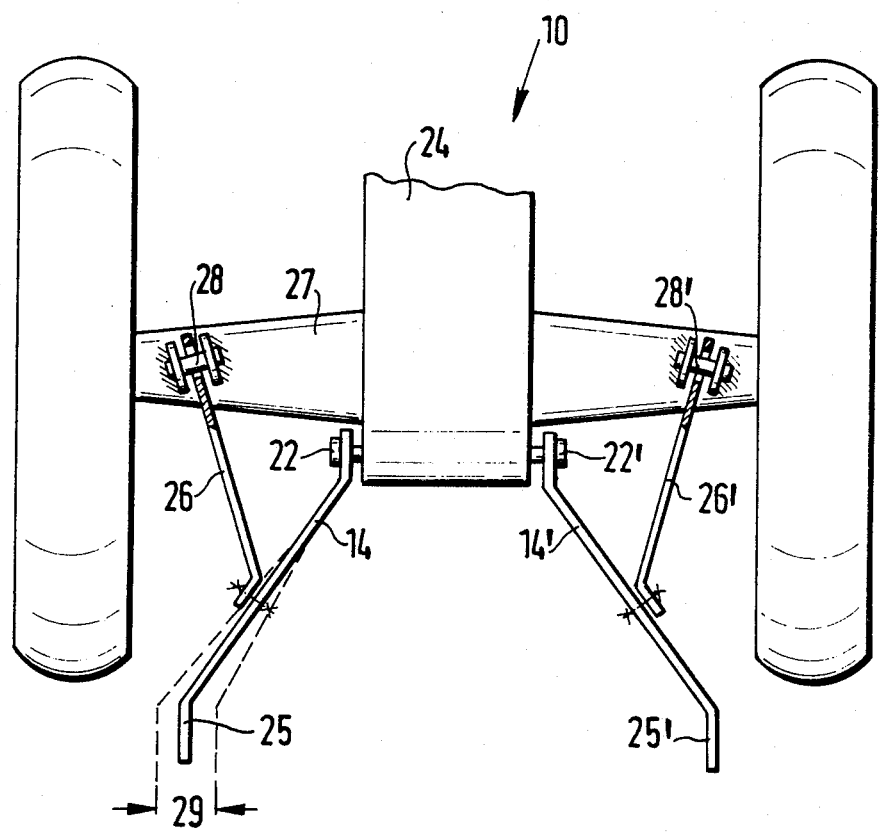
FIG. 2 is a partial lower view of the tractor in accordance with the present invention in FIG. 1.

FIG. 2 shows a part of the tractor 10 in accordance with FIG. 1 on a lower view, in which the double arrangement of the lower lever 14 is clearly seen. The double arrangement is indicated with the same reference numerals with addition of the index prime. Both lower levers 14 and 14' are turnably supported on the housing 24 of the tractor 10 through their associated force measuring pins 22 and 22'. The connecting points formed by the force measuring pins 22 and 22' lie relatively closer to one another depending upon the type of of the tractor housing 24.

In contrast, the coupling points 25 and 25' for the attachment 11 through the bent lower lever 14 and 14' are arranged farther from one another. Further, each lower lever 14 and 14' is supported on the lower axle 27 fixed with the housing of the tractor 10, through a side guiding rod 26 and 26' respectively. The side guiding rods 26 and 26' are provided in their coupling points 28 and 28' on the lower axle 27 with a longitudinal opening. Thereby each lower lever 14 and 14' can perform on its coupling point 25 or 25' a maximal lateral movement at a distance 29 on the coupling point 25.

Figure 3:
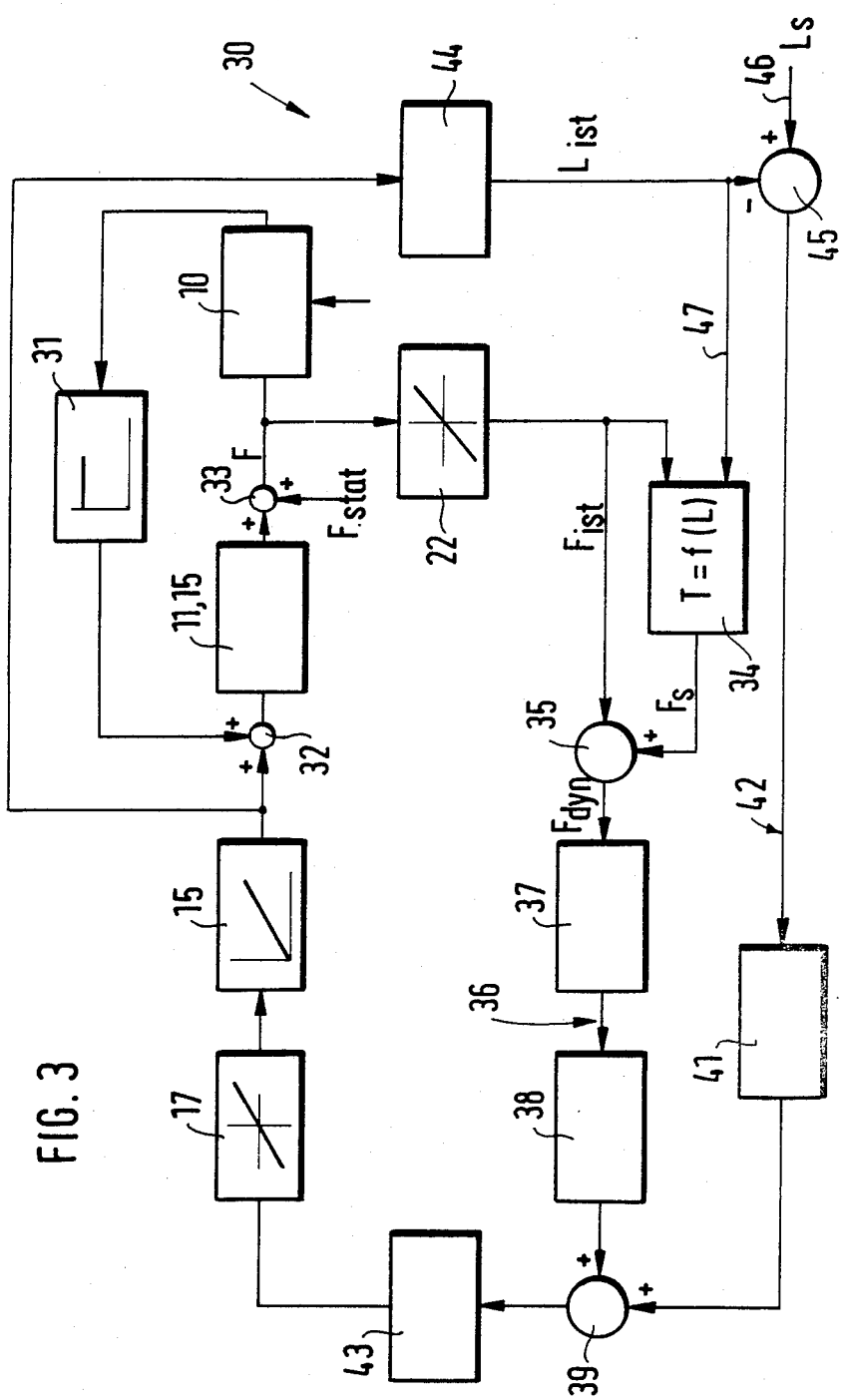
FIG. 3 is a block diagram for a device for vibration damping in accordance with FIG. 1 in a simplified showing.

FIG. 3 shows a block diaphragm in a simplified view for a device 30 for dynamic stabilization of the movement of the vehicle 10, or in other words for active vibration damping, which is integrated in the lifting mechanism device 19 of FIG. 1.

The system of the attachment 11, the force lift 15, and the tractor 10 forms a vibration-sensitive unit which under the action of impacts from outside on the tractor 10 can be subjected to vibrations. The pitch angle of the tractor 10 about its vibration axis 21 is changed by different kinematic factors 31 and supplied to a first summation point 32. At a second summation point 33 between the attachment 11 and the tractor 10, a statistic force $F_{stat}$ produced from the mass of attachment 11 is supplied, so that the whole force F acts on the force measuring pin 22. With the force measuring pin 22 of the lifting mechanism regulating device 19, simultaneously the signal for the movement of the attachment 11 serving as suppression mass is recovered. The force measuring pin 22 supplies an output signal in the form of an electric voltage which is proportional to the value of the respective force, especially the horizontal force transmitted from the lower lever 14. Then by a low pass filter 34 the dynamic and the static portions are separated from one another so that at a third summation point 35 an electric output signal is produced which corresponds to the dynamic portion and is thereby proportional to the force $F_{dyn}$, which first of all is produced by the impact on the tractor 10 for example because of street unevenness.

These signals which are proportional to the dynamic force portion serve as output values for the force regulating circuit 36 and are introduced into a proportional regulator 37. The output signal of the first regulator 37 is supplied through a dead zone-comparator 38 to a fourth summation point 39, at which additionally the output signal of a second regulator 41 in a position regulating circuit 42 is supplied. The output signal from the fourth summation point 39 is supplied through a switching device 43 to dead zone comparison and acts on the regulating valve 17 which in turn influences the force lift 15. The position-dependent output signal of the force lift 15 acts on the one hand through the first summation point 32 on the attachment 11 and on the other hand on the position sensor 44. The electric output signal of the position sensor 44 is compared on the one hand in a fifth summation point 45 with a position nominal value 46 and thereby the thus formed regulating deviation of the position inputted into the second regulator 41. In addition, a position actual value acts through an operational connection on the low pass filter 34 so that its time constant changes in dependence upon its position influence, as will be described hereinbelow.

When the tractor 10 travels with the lifted attachment 11 as shown in FIG. 1, over uneven terrain, the pitch and vertical vibrations of the truss occur, which because of the mass inertia of the attachment 11 lead to acceleration forces measured by the force measuring pins 22 and 22'. The force measuring pins 22 and 22' supply proportional signals to the horizontal forces which act on them. With the sum of the signals from both force measuring pins 22 and 22', the electrohydraulic lifting mechanism regulating device 19 provides an active vibration damping in that the coupled attachment 11 is moved in a suitable manner. During straight travel the whole horizontal force which is produced in lower levers 14 and 14' by the weight of the attachment 11 is supplied to the force measuring pins 22 and 22'. This normal active vibration damping is known.

In contrast to quiet straight travel, in travel of the tractor 10 on curves, influences act on the device 30 for active vibration damping which affect an optimal operation. Thus, during a curve travel, the lifted attachment 11 moves laterally because of its mass inertia and supported by the side guiding rods 26 and 26'. The side guiding rods take over a part of the horizontal forces transmitted by the lower links 14 and 14'. The horizontal forces which are transferred on the force measuring pins 22 and 22' with the conventional geometry and kinematics of the three-point linkage 12 are considerably reduced. The force measuring pin signals break suddenly by a predetermined amount. Such short breaks in the force signals can occur when the tractor 10 performs wobbling vibrations during a straight travel, and a lateral reciprocating swinging of the attachment 11 occurs. These transitory breaks in the summation signal of the force can sensitively disturb the vibration damping operation if no countermeasures are taken. This condition during the travel on curves can be recognized in FIGS. 4 and 5 in which the signal courses are shown in detail.

FIG. 4 shows the signal course of the force F during travel on curves of the tractor 10 in the vibration damping region, while FIG. 5 shows the associated signal course of the lifting height or the position versus time. A first solid line 51 in FIG. 4 shows the course of the actual value of the force F during a curve travel. At the beginning of the curve 52 the actual value of the summation force F measured by the force measuring pin 22 brakes suddenly, since a part of the horizontal force is taken over by a side guiding rod 26 and 26'. This force break is obtained during the time of the curve travel, and this time can be within the limits of 3-6 seconds. At the end of the curve 53 the side guiding rods 26 and 26' are again unloaded so that the actual value of the force again assumes its old value.

As can be seen in FIG. 4 in connection with FIG. 3, the force nominal value $F_s$ which is formed in the low pass filter 34 at its output changes only slowly in contrast to the dynamic force actual value. The signal course of this force nominal value is identified in FIG. 4 by a second dash line 54. The regulator 37 in the force regulating circuit 36 reacts to the regulating difference 55 which occurs at the beginning of the curve and is produced from the course of the curve 51 and 54, with a lifting of the attachment 11 to its abutment. As can be seen from FIG. 5, this abutment is reached when the position actual value corresponds to a position of upper end position, as identified in FIG. 5 by limiting line 56. The attachment 11 is lifted outwardly from an average lifting position 57, about which the attachment 11 can vibrate in the vibration damping region to both sides. The distance between the average lifting position 57 and the upper limit line 56 is formed within the limit of approximately 3% of the whole lifting height.

At the curve end 53 a high negative regulating difference corresponding to the value 55 is produced by the sudden increase of the force actual value 51. This slowly decreasing regulating difference corresponding to the second line 54 causes the regulator 37 to further lower the attachment 11. This is shown in FIG. 5 by the solid curve 59 for the position actual value which drops in connection with the curve end 53 considerably under the average lifting position 57. This deep lowering of the attachment 11 in the vibration damping region is not only disturbing but also is dangerous when the attachment 11 can hit the ground. In addition, from safety reasons, the lifting amplitudes during the swinging damping must be maintained as small as possible.

For avoiding the excessive outward vibrations in accordance with curve 59 after the end of the curve 53, the understanding is used that a reduction in the regulating difference 55 during the curve travel 61 must lead to smaller vibration amplitudes. This can be achieved in a relatively simple manner in that the time constant T in the low pass filter 34 is changed in dependence upon the magnitude of the position actual value, for each purpose an operative connection 47 is provided. This can be achieved in an especially advantageous manner when the electronic control device 18 is implemented in digital technique and has a microprocessor with the changing time constant T which can be realized in a software. The time constant T is selected so that it assumes nominal value when the position actual value reported through the operating connection 47 corresponds to the average lifting position 47 in FIG. 5. The time constant cannot be smaller than this nominal value. When to the contrary the position actual value increases, the time constant T will grow. When the lifting mechanism reaches its upper end position in accordance with the limiting line 56, also the time constant T of the low pass filter 34 is very high. With decreasing position from 56 to 57 the time constant T decreases further.

By this manipulation of the time constant T in low pass filter 37 of the force regulating circuit 36, it is achieved that during the curve travel 61 the effective force nominal value $F_{se}$ does not fall and thereby does not run in accordance with the dash line 57, but instead runs in accordance with the dot line 62. At the end of the curve 53 the second regulating difference 63 is thereby relatively small, and therefore an excessive sinking of the lifting mechanism in accordance with the curve end 53 is prevented. In correspondence with the smaller second regulating difference 63, the actual value signal of the position in FIG. 5 runs in accordance with a second dot curve 64. As shown in FIG. 5, the amplitude of the second curve 64 relative to the average lifting position 57 is substantially smaller than that of the first curve 59.

The device 30 can therefore perform the function of the active vibration suppression during curve travel of the tractor and/or during lateral swinging of the attachment 11 in a considerably more efficient and reliable manner. Simultaneously, the lifting height of the lifting mechanism can be used therefore in an optimal way, since the adjusting movements during the vibration suppression are maintained generally smaller.

For further limiting the lifting mechanism amplitude in the vibration suppression, the second regulator 41 is formed in the position regulating circuit 42. In this subordinate position regulating circuit 42 the position nominal value 46 is presupplied in the vibration damping operation by the magnitude of the average lifting position 57. The actual position of the lifting mechanism serves as position actual value, detected at the output of the position sensor 44. As can be seen in FIG. 6, which shows the output value of the second regulator 41 in dependence upon the introduced regulating difference of the position, the second proportionally operating regulator 41 has a buckled characteristic line 65. The characteristic line 65 of the regulator 41 is selected so that the amplification in the subordinate position regulating circuit 42 considerably increases when the position actual value moves more than 2% from the average lifting position 57, wherein the whole stroke of the lifting mechanism is taken for 100%. In this manner, a break of the position actual value is additionally made difficult. In a normal operation, when the regulating deviation of the position remains under 2%, the position amplification is relatively small so that the force regulating circuit 36 which is decisive for the vibration suppression remains correspondingly sensitive.

The formation of the second regulator 41 with the buckled characteristic line 65 can be also separated from the changing time constant in the power regulating circuit 36 alone, for positively influencing the active vibration damping during the curve travel. Combination of both features provides for an especially operationally efficient vibration damping on the tractor 10 during curve travels and comparable vibration situations.

It is to be understood that the changes in the shown embodiments is possible without deviating from the invention. While the formation of the elements for a regulating device is especially advantageous in digital technique, their use on an electrohydraulic regulating device with analog technique is not excluded. Also, these elements can be used for other pulling machines, such as for example harvester threshers, when comparable vibration situations occur. It is also true when the attachment is mounted frontally or laterally. Also, the construction vehicles can have comparable vibration situations.

It is understood also that the device is not limited to the shown tractor type in which the side guidance linkage is formed of rigid rods and can transfer the pulling and pressing forces. The same break in the summation signal occurs when instead of the rigid rods for the side guidance, pulling chains are utilized. The same is true when the side guidance is performed by supporting surfaces or cams fixed on the housing, which limit the lateral movement of the levers. All these means are identified in general as side guiding elements. Further, the force measuring pin can be formed differently than that shown in FIG. 2. Further, depending on the type of the tractor, the levers can extend parallel to one another or for example can be articulately connected with the rear axis.

While the device is especially advantageous to be used with force measuring pins, it is possible instead of them to use other force sensors with which during the curve travel of the tractor and/or lateral vibrations of the attachment similar signal course occurs with a brake in the summation signal.

It will be understood that each of the elements described above, or two or more together, may also find a useful application in other types of constructions differing from the types described above.

While the invention has been illustrated and described as embodied in an agricultural pulling machine with a coupled working attachment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An agricultural pulling machine, such as a tractor or construction machine vehicle, with an attachment, comprising a mounting device for coupling the attachment to the agricultural machine; a device for active damping of pitch vibrations about a transverse horizontal axis of the vehicle, said device for active damping including a power lift for vertically moving said mounting device, a regulating means which controls said power lift for moving said mounting device within a region of its lifted position in dependence upon sensed pitch vibrations of the vehicle during travel, and a force sensor to sense said pitch vibrations and produce signals to which said regulating means response, said mounting device comprising a lever connected at one end to a housing of the vehicle, a side guiding member connected between a mid portion of said lever and said housing of the vehicle, said force sensor being arranged in a force flux of said lever between its connecting point to said housing and a supporting point of said side guiding member, said regulating means including means for reducing disturbing influences on an operation of said vibration damping device caused by said side guiding member during travel over a curve by the vehicle.

2. An agricultural pulling machine as defined in claim 1, wherein said force sensor is formed as a force measuring pin supported on said one end of said lever.

3. An agriculatural pulling machine as defined in claim 1, wherein said vehicle is a tractor, said attachment being a plow, and said mounting device being a three-point linkage connecting said plow with said tractor.

4. An agricultural pulling machine as defined in claim 1, wherein said force sensor includes two force measuring pins, said mounting device having two lower levers which are supported pivotally on the housing through a respective one of said force measuring pins, one end of each of said lower levers being pivotally supported on said housing; and further comprising side guiding members through which a mid portion of each of said lower levers is supported to said housing.

5. An agricultural pulling machine as defined in claim 4, wherein said side guiding members are formed as rods.

6. An agricultural pulling machine as defined in claim 4, wherein said side guiding members are formed as pulling chains.

7. An agricultural pulling machine as defined in claim 1, wherein said regulating means has an electronic control device which is formed by digital technique and provided with a microprocessor.

8. An agricultural pulling machine, such as a tractor or construction machine vehicle, with an attachment, comprising a mounting device for coupling the attachment to the agricultural machine; a device for active damping of pitch vibrations about a transverse horizontal axis of the vehicle, said device for active damping including a power lift for vertically moving said mounting device a regulating means which controls said power lift for moving said mounting device within a region of its lifted position in dependence upon sensed pitch vibrations of the vehicle during travel, and a force sensor to sense said pitch vibrations and produce signals to which said regulating means responds, said mounting device comprising a lever connected at one end to a housing of the vehicle, a side guiding member connected between a mid portion of said lever and said housing of the vehicle, said force sensor being arranged in a force flux of said layer between its connecting point to said housing and a supporting point of said side guiding member, said regulating means including means for reducing disturbing influences on an operation of said vibration damping device caused by said use guiding member during travel over a curve by the vehicle, wherein said regulating means has a position regulating circuit and a force regulating circuit associated with an active vibration damping by said vibration damping device, said means for reducing influencing being formed as a low pass filter located in said force regulating circuit and having a time constant which charges in dependence upon actual value signals of a position sensor.

9. An agricultural pulling machine as defined in claim 8, wherein said power lift has a lifting mechanism, said low pass filter, in a position corresponding to an average lifting position, has a time constant T as a nominal value and its value increases during deviation of said lifting mechanism in a direction of an upper end position and remains unchanged during deviation within its average lifting position.

10. An agricultural pulling machine, such as a tractor or construction machine vehicle, with an attachment, comprising a mounting device for coupling the attachment to the agricultural machine; a device for active damping of pitch vibrations about a transverse horizontal axis of the vehicle, said device for active damping including a power lift for vertically moving said mounting device, a regulating means which controls said power lift for moving said mounting device within a region of its lifted position in dependence upon sensed pitch vibrations of the vehicle during travel, and a force sensor to sense said pitch vibrations and produce signals to which said regulating means responds, said mounting device comprising a lever connected at one end to a housing of the vehicle, a side guiding member connected between a mid portion of said lever and said housing of the vehicle, said force sensor being arranged in a force flux of said lever between its connecting point to said housing and a supporting point of said side guiding member, said regulating means including means for reducing disturbing influences on an operation of said vibration damping device caused by said side guiding member during travel over a curve by the vehicle; wherein said means for reducing influences comprises a subordinated position regulating circuit provided with a regulator, said regulator having a higher amplification factor outside of a predetermined inner working region.

11. An agricultural pulling machine as defined in claim 10, wherein said regulator is formed as a proportional regulator with a buckled characteristic line.

12. A method of dynamic stabilization of pitch vibrations about a horizontal vibration axis of a vehicle with an attachment articulately connected to the vehicle and vertically adjustable relative thereto by a power lift which is controlled by a force regulating circuit in dependence upon a signal of a force sensor which senses the pitch vibrations of the vehicle, the method comprising the steps of detecting horizontal force in a lever which is pivotally supported between a housing of the vehicle and said attachment and which is stabilized by a side guiding member, wherein during a signal break of the force sensor, which occurs during curve travel or transverse vibration of the attachment, maintaining an occurring regulation difference at the end of said signal break at a relatively small level by a position dependent change in a time constant of a low pass filter operating in the force regulating circuit, and controllably actuating said power lift to actively damp said pitch vibrations.

13. A method as defined in claim 12 and further comprising the step of increasing an amplification factor of a regulator in a subordinate position regulating circuit in the case of exceeding a predetermined limiting value of a regulating deviation of the position of the power lift.

* * * * *